US008695743B2

(12) United States Patent
Kraxner

(10) Patent No.: US 8,695,743 B2
(45) Date of Patent: Apr. 15, 2014

(54) HYBRID VEHICLE

(75) Inventor: Dieter Kraxner, Vaihingen an der Enz (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 66 days.

(21) Appl. No.: 13/257,329

(22) PCT Filed: Dec. 24, 2009

(86) PCT No.: PCT/EP2009/009271
§ 371 (c)(1),
(2), (4) Date: Sep. 19, 2011

(87) PCT Pub. No.: WO2010/112057
PCT Pub. Date: Oct. 7, 2010

(65) Prior Publication Data
US 2012/0014815 A1 Jan. 19, 2012

(30) Foreign Application Priority Data
Mar. 31, 2009 (DE) .................. 10 2009 016 673

(51) Int. Cl.
*B60K 6/38* (2007.10)
(52) U.S. Cl.
USPC ....... 180/165; 180/65.265; 903/903; 903/946
(58) Field of Classification Search
USPC ............. 180/165, 65.21, 65.265, 65.31, 65.6, 180/305, 306, 307; 903/903, 946
See application file for complete search history.

(56) References Cited

U.S. PATENT DOCUMENTS

| 5,495,912 | A | * | 3/1996 | Gray et al. | 180/165 |
| 5,887,674 | A | * | 3/1999 | Gray, Jr. | 180/307 |
| 5,924,406 | A | | 7/1999 | Kinugasa et al. | |
| 6,048,288 | A | * | 4/2000 | Tsujii et al. | 477/5 |
| 6,565,473 | B2 | * | 5/2003 | Endo et al. | 475/117 |
| 6,834,737 | B2 | * | 12/2004 | Bloxham | 180/165 |
| 7,028,794 | B2 | * | 4/2006 | Odahara et al. | 180/65.25 |
| 7,600,376 | B2 | * | 10/2009 | Hall et al. | 60/413 |
| 7,841,432 | B2 | * | 11/2010 | Lynn et al. | 180/65.21 |
| 7,882,910 | B2 | | 2/2011 | Kluge et al. | |
| 8,342,995 | B2 | * | 1/2013 | Grant | 475/1 |
| 2007/0095587 | A1 | | 5/2007 | DuCharme | |
| 2010/0122864 | A1 | * | 5/2010 | Rosman | 180/165 |

FOREIGN PATENT DOCUMENTS

| DE | 102 31 818 | 2/2004 |
| DE | 10 2006 013 502 | 9/2007 |
| DE | 10 2006 060 872 | 6/2008 |

(Continued)

*Primary Examiner* — John Walters
(74) *Attorney, Agent, or Firm* — Gerald E. Hespos; Michael J. Porco; Matthew T. Hespos

(57) ABSTRACT

A hybrid vehicle has an internal combustion engine (10) and a hybrid drive (12) that has an electric machine (11) and a transmission (13) having a drive output. During driving under purely internal combustion engine (10) power, only the internal combustion engine provides a drive torque at the drive output. During driving under purely electric motor power, only the electric machine (11) provides a drive torque at the drive output. During hybrid driving, the internal combustion engine (10) and the electric machine (11) each provide a drive torque at the drive output. The hybrid vehicle also has a pump unit (16, 20). The pump unit (16, 20) can be driven by the electric machine (11) of the hybrid drive (12).

14 Claims, 2 Drawing Sheets

(56) References Cited

FOREIGN PATENT DOCUMENTS

| | | |
|---|---|---|
| DE | 10 2007 018 967 | 10/2008 |
| EP | 0 811 757 | 12/1997 |
| JP | 09-324665 | 12/1997 |
| JP | 11-147424 | 6/1999 |
| JP | 2006-097902 | 4/2006 |

* cited by examiner

HYBRID VEHICLE

BACKGROUND OF THE INVENTION

1. Field of the Invention

The invention relates to a hybrid vehicle according to the preamble of patent claim 1.

2. Description of the Related Art

A hybrid vehicle has a hybrid drive composed of an internal combustion engine and an electric machine. The electric machine of the hybrid drive may be operated both as a motor and as a generator. In addition to the hybrid drive, a hybrid vehicle comprises a transmission designed preferably as an automatic shift transmission. During driving of the hybrid vehicle under purely internal combustion engine power, only the internal combustion engine of the hybrid drive provides a drive torque at a drive output of the hybrid vehicle. In contrast, during driving under purely electric motor power, only the electric machine of the hybrid drive provides a drive torque at the drive output of the hybrid vehicle. When the hybrid vehicle is operated in a hybrid driving mode, both the internal combustion engine and also the electric machine of the hybrid drive each provide a drive torque at the drive output of the hybrid vehicle.

Furthermore, it is already known from practice for hybrid vehicles to have at least one pump unit, in particular a hydraulic pump for supplying hydraulic oil to the transmission and/or to auxiliary units. Until now, pump units of said type have been assigned a separate drive, for example a separate electric motor, in order thereby to ensure that the pump unit can be operated even when the internal combustion engine of the hybrid drive is shut down. A separate drive for pump units is however disadvantageous because the separate drives require a relatively large amount of installation space, and also increase the overall weight of the hybrid vehicle.

SUMMARY OF THE INVENTION

The invention is based on the object of providing a hybrid vehicle in which a separate drive for pump units can be dispensed with.

The object is achieved by a hybrid vehicle with a pump unit that can be driven by the electric machine of the hybrid drive.

If, as proposed by the present invention, a pump unit of the hybrid vehicle is driven by the electric machine of the hybrid drive, it is possible to dispense with a separate drive for the pump unit. Even when the internal combustion engine is shut down, the pump unit can then be driven by the electric machine of the hybrid drive.

Refinements of the invention will emerge from the following description. Exemplary embodiments of the invention will be explained with reference to the drawing, without the invention being restricted to said exemplary embodiments.

DETAILED DESCRIPTION OF THE PREFERRED EMBODIMENTS

Figure 1:
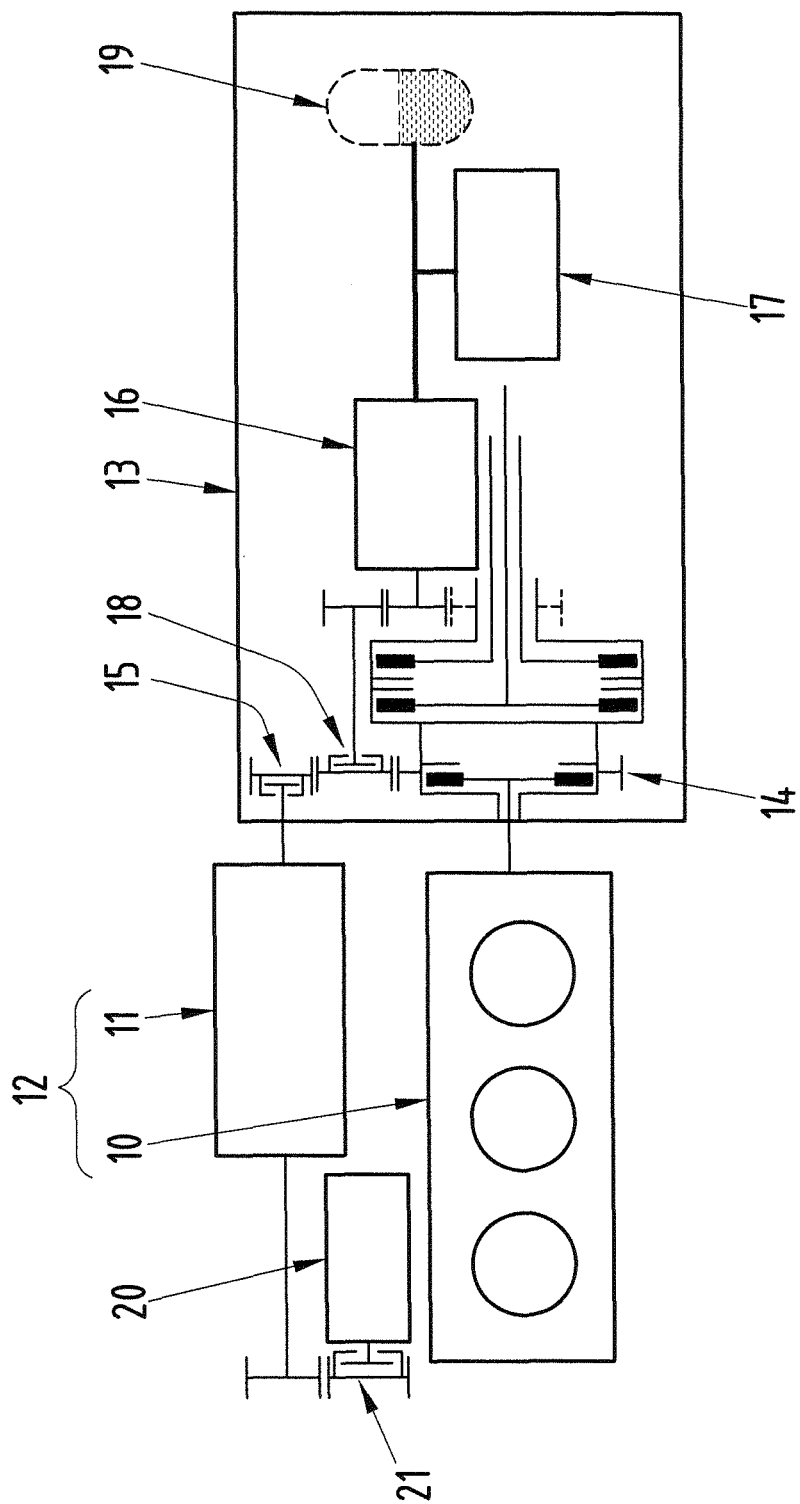
FIG. 1 shows a highly schematic depiction of a hybrid vehicle for illustrating the invention.

FIG. 1 shows a highly schematic depiction of assemblies in the drivetrain of a hybrid vehicle, wherein FIG. 1 shows an internal combustion engine 10 and an electric machine 11, which together form a hybrid drive 12 of a hybrid vehicle.

In addition to the internal combustion engine 10 and the electric machine 11, which together form the hybrid drive 12 of the hybrid vehicle, FIG. 1 also shows a transmission 13 designed as an automatic shift transmission. The transmission 13 of FIG. 1 is a so-called double clutch transmission.

Both the internal combustion engine 10 and also the electric machine 11 of the hybrid drive 12 act on the transmission 13, specifically, in the configuration shown in FIG. 1, in that the internal combustion engine 10 and the electric machine 11 of the hybrid drive 12 are arranged parallel to one another and act in parallel with one another on the transmission 13. The internal combustion engine 10 can be coupled to and decoupled from the transmission 13 by means of a transmission-internal clutch 14. The electric machine 11 can be coupled to and decoupled from the transmission 13 by means of a further transmission-internal clutch 15.

The hybrid vehicle also comprises a pump unit designed as a hydraulic pump 16, wherein in the configuration of FIG. 1, the hydraulic pump 16 is a transmission-internal hydraulic pump 16. In the configuration of FIG. 1, hydraulic oil for at least one transmission-internal assembly 17 can be provided by means of the hydraulic pump 16. Auxiliary units may alternatively or additionally be supplied with hydraulic oil by means of the hydraulic pump 16.

Within the context of the present invention, the hydraulic pump 16, which in the configuration of FIG. 1 is a transmission-internal hydraulic pump, may be driven by the electric machine 11 of the hybrid drive 12, such that accordingly no separate drive is required for the hydraulic pump 16.

In one advantageous refinement of the invention, a clutch 18 is connected between the hydraulic pump 16 and the electric machine 11 of the hybrid drive. When the clutch 18 is closed, the electric machine 11 of the hybrid drive 12 can drive the hydraulic pump 16, specifically when the clutch 15 is additionally closed. In contrast, when the clutch 18 is open, the hydraulic pump 16 is decoupled from the electric machine 11 of the hybrid drive, such that then the electric machine 11 of the hybrid drive 12 does not drive the hydraulic pump 16, specifically even when the clutch 15 is supposed to be closed.

According to FIG. 1, the hydraulic pump 16 is assigned a hydraulic accumulator 19. When a filling level of the hydraulic accumulator 19 is above a limit value, the hydraulic pump 16 does not fill the hydraulic accumulator 19. In contrast, if the filling level of the hydraulic accumulator 19 is below a limit value, the hydraulic accumulator 19 is filled by the hydraulic pump 16. For this purpose, in the configuration of FIG. 1, an approach is taken in which, when the filling level of the hydraulic accumulator 19 is above the corresponding limit value, the clutch 18 is open, such that the hydraulic pump 16 cannot be driven by the electric machine 11 of the hybrid drive 12. In contrast, when the filling level of the hydraulic accumulator 19 is below the corresponding limit value, the clutch 18 is closed, such that the hydraulic pump 16 can then be driven by the electric machine 11 of the hybrid drive 12 in order to fill the hydraulic accumulator 19.

The filling of the hydraulic accumulator 19 by means of the hydraulic pump 16 may be made dependent not only on the filling level of said hydraulic accumulator but also on the efficiency of the overall system. It may thus be provided that the hydraulic pump 16 fills the hydraulic accumulator 19 only when the efficiency of the hybrid vehicle is increased in this way. It may thus be provided, for example, that the hydraulic accumulator 19 is filled by means of the hydraulic pump 16 during braking of the hybrid vehicle, in order thereby to utilize braking energy for filling the hydraulic accumulator 19.

By means of a control device which is not shown, the clutch 18 which is connected between the electric machine 11 of the hybrid drive 12 and the hydraulic pump 16 can be automatically opened or closed, specifically preferably as a function of the filling level of the hydraulic accumulator and/or as a function of the efficiency of the hybrid vehicle 19.

As has already been stated, the hydraulic pump 16 may be a transmission-internal or alternatively a transmission-external hydraulic pump. The hydraulic pump 16 may be designed as a fixed-displacement pump which always provides a constant delivery volume at a defined rotational speed. The hydraulic pump 16 may alternatively also be designed as a variable-displacement pump whose delivery volume at a defined rotational speed can be adjusted or varied. The hydraulic pump 16 may alternatively or additionally be driven by the internal combustion engine 11.

In the configuration of FIG. 1, a pump unit designed as an air-conditioning compressor 20 of an air-conditioning system of the hybrid vehicle can also be driven by means of the electric machine 11 of the hybrid drive 12, wherein a clutch 21 is connected between the electric machine 11 of the hybrid drive 12 and the air-conditioning compressor 20. When the clutch 21 is open, the air-conditioning compressor 20 is decoupled from the electric machine 11 of the hybrid drive 12, wherein then said air-conditioning compressor is not driven by the electric machine 11 of the hybrid drive 12. Only when the clutch 21 is closed can the air-conditioning compressor 20 also be driven by the electric machine 11 of the hybrid drive 12. The air-conditioning compressor 20 can be driven independently of the hydraulic pump 16 by the electric machine 11 of the hybrid drive 12.

The configuration illustrated in FIG. 1, in which the internal combustion engine 10 and the electric machine 11 of the hybrid drive 12 act in parallel on a transmission 13 designed as a double clutch transmission, is merely an example.

Figure 2:
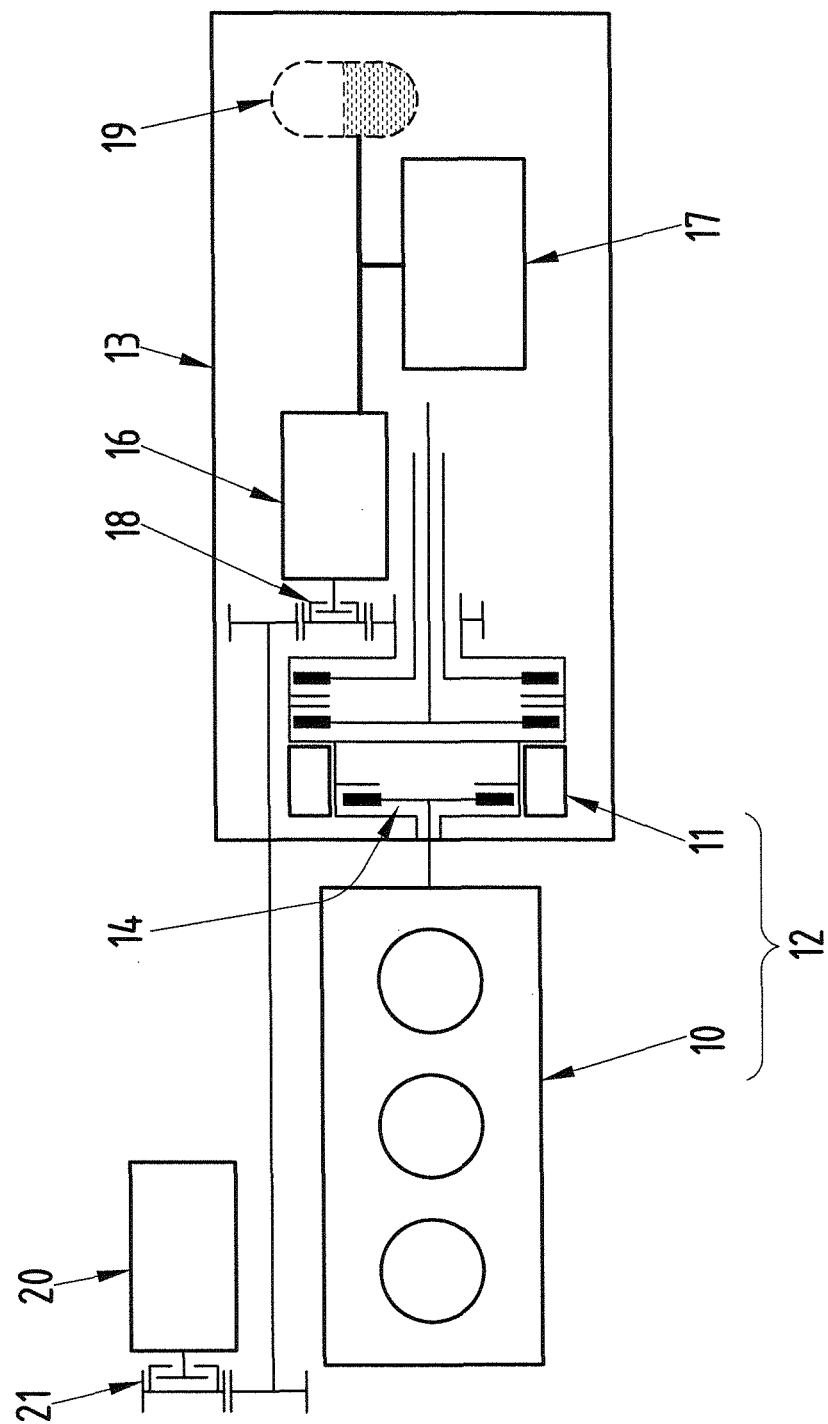
FIG. 2 shows a highly schematic depiction of a further hybrid vehicle for illustrating the invention.

In contrast thereto, it is also possible, as shown by the configuration in FIG. 2, for the electric machine 11 of the hybrid drive 12 to act on the transmission 13 coaxially with the internal combustion engine 10. In this case, the arrangement of the clutch 18 connected between the hydraulic pump 16 and the electric machine 11 of the hybrid drive 12 is changed, and the clutch 15 is omitted.

The invention claimed is:

1. A hybrid vehicle, comprising: an internal combustion engine; a hybrid drive that has an electric machine arranged in parallel with the internal combustion engine; a transmission having a drive output; a first clutch between the internal combustion engine and the drive output, so that the internal combustion engine provides a drive torque at the drive output when the first clutch is closed, a second clutch between the electric machine and the drive output so that the electric machine provides a drive torque at the drive output when the second clutch is closed, the first and second clutches being closed simultaneously during hybrid driving so that the internal combustion engine and the electric machine each provide a drive torque at the drive output; a pump unit; and a third clutch between the second clutch and the pump unit so that the pump unit can be driven by the electric machine of the hybrid drive when both the second and third clutches are closed.

2. The hybrid vehicle of claim 1, wherein the third clutch is disposed so that the electric machine cannot drive the pump unit when either the second clutch or the third clutch is open.

3. The hybrid vehicle of claim 2, wherein the pump unit is a hydraulic pump that functions for supplying hydraulic oil to at least one of the transmission and auxiliary units and wherein the hydraulic pump can be driven by the electric machine of the hybrid drive.

4. The hybrid vehicle of claim 3, further comprising a hydraulic accumulator, wherein the hydraulic pump fills the hydraulic accumulator if a filling level of the hydraulic accumulator is below a limit value, and that the hydraulic pump does not fill the hydraulic accumulator if the filling level of the hydraulic accumulator is above a limit value.

5. The hybrid vehicle of claim 4, wherein if the filling level of the hydraulic accumulator is above the corresponding limit value, the third clutch is open, such that the hydraulic pump cannot be driven by the electric machine of the hybrid drive.

6. The hybrid vehicle of claim 4, wherein if the filling level of the hydraulic accumulator is below the corresponding limit value, the third clutch is closed, such that the hydraulic pump can be driven by the electric machine of the hybrid drive in order to fill the hydraulic accumulator.

7. The hybrid vehicle of claim 4, further comprising a control device that automatically opens or closes the third clutch.

8. The hybrid vehicle of claim 7, wherein the control device automatically opens or closes the clutch as a function of the filling level of the hydraulic accumulator and/or as a function of an efficiency of the hybrid vehicle.

9. The hybrid vehicle of claim 3, wherein the hydraulic pump is a fixed-displacement pump that always provides a constant delivery volume at a defined rotational speed.

10. The hybrid vehicle of claim 3, wherein the hydraulic pump is a variable-displacement pump whose delivery volume at a defined rotational speed is adjustable.

11. The hybrid vehicle of claim 3, wherein the hydraulic pump is a transmission-internal hydraulic pump.

12. The hybrid vehicle of claim 3, wherein the hydraulic pump (16) is a transmission-external hydraulic pump.

13. The hybrid vehicle of claim 3, wherein the hydraulic pump can alternatively or additionally be driven by the internal combustion engine of the hybrid drive.

14. The hybrid vehicle of claim 1, further comprising an air-conditioning compressor that can be driven by the electric machine of the hybrid drive.

* * * * *